US012808657B2

(12) United States Patent
Jiang et al.

(10) Patent No.: US 12,808,657 B2
(45) Date of Patent: Nov. 24, 2026

(54) METHOD FOR MEASURING AND CALIBRATING DIMENSIONS OF STEEL PLATE

(71) Applicant: Taiyuan University of Science and Technology, Taiyuan (CN)

(72) Inventors: Lianyun Jiang, Taiyuan (CN); Ziliang Li, Taiyuan (CN); Junxu Yan, Taiyuan (CN); Lifeng Ma, Taiyuan (CN); Qianglv He, Taiyuan (CN); Keyun Hu, Taiyuan (CN); Zhiquan Huang, Taiyuan (CN); Yanchun Zhu, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 52 days.

(21) Appl. No.: 19/026,211

(22) Filed: Jan. 16, 2025

(65) Prior Publication Data

US 2025/0383195 A1 Dec. 18, 2025

(30) Foreign Application Priority Data

Jun. 13, 2024 (CN) ......................... 202410756627.3

(51) Int. Cl.

*G01B 11/02* (2006.01)
*G01B 11/00* (2006.01)

(52) U.S. Cl.

CPC .......... *G01B 11/026* (2013.01); *G01B 11/005* (2013.01)

(58) Field of Classification Search

CPC .... G01B 11/026; G01B 11/005; G01B 11/245
See application file for complete search history.

(56) References Cited

U.S. PATENT DOCUMENTS 11,092,432 B2 * 8/2021 Zweckinger ........... G01N 21/93
2012/0081539 A1 * 4/2012 Ichizawa .............. G01B 11/245 348/95

* cited by examiner

*Primary Examiner* — Seung C Sohn
(74) *Attorney, Agent, or Firm* — MATTHIAS SCHOLL P.C.; Matthias Scholl

(57) ABSTRACT

A method for measuring and calibrating the dimensions of a steel plate by using a calibration device and a measurement device including: fixedly disposing the calibration mechanism on the roller table; aligning a top surface of the calibration mechanism with a surface of the steel plate, and defining the top surface of the calibration mechanism as a baseline position; raising the calibration mechanism by a known height $\Delta H$ using the lifting mechanism; defining a working distance $H_2$ between the plurality of cameras and the calibration mechanism raised by the known height $\Delta H$; calculating parameters $P_0$ and $D_0$ at the working distance $H_0$, and calculating parameters $P_2$ and $D_2$ at the working distance $H_2$; capturing data about coordinates ($X_w$, $Y_w$, $Z_w$) of a surface of the steel plate in a world coordinate system, and combining the data to construct the surface of the steel plate.

5 Claims, 13 Drawing Sheets

METHOD FOR MEASURING AND CALIBRATING DIMENSIONS OF STEEL PLATE

Pursuant to 35 U.S.C. § 119 and the Paris Convention Treaty, this application claims foreign priority to Chinese Patent Application No. 202410756627.3 filed Jun. 13, 2024, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of 3D dimensions measurement and calibration, and more particularly, to a method for measuring and calibrating the dimensions of a steel plate.

Industries such as rail transportation, heavy equipment manufacturing, defense, and aerospace demand stringent accuracy for the dimensions of steel plates. Key machines in steel plate processing, such as straighteners and flatteners, rely on accurate dimension data to automate and optimize the correction process. The steel plates are various in sizes and thicknesses, making it difficult to maintain consistent accuracy during the correction process. Structured light measurement technology is a preferred solution for capturing the 3D dimensions of the steel plates due to its non-contact nature, high efficiency, and simplicity. The structured light measurement technology has advanced rapidly with the development of machine vision systems and is now a cornerstone for smart manufacturing. Multi-camera structured light measurement system is a crucial technology for capturing accurate 3D dimensions data of the steel plates with varying specifications. The multi-camera structured light measurement system plays a significant role in the automation and digitalization of metal processing and finishing equipment. The multi-camera structured light measurement system typically includes cameras, lasers, fixtures, industrial control computers, algorithms, and software. The multi-camera structured light measurement system projects structured light onto the surface of an object. The cameras record the deformation data of the light pattern. The deformation data is processed to create a 3D model of the surface, known as a point cloud. In the multi-camera structured light measurement system, proper calibration is essential to maintain accuracy of the multi-camera structured light measurement system.

In a conventional multi-camera system, calibration often involves several fitting processes. As each fitting process adjusts parameters based on assumptions and approximations, errors can accumulate during the multi-step calibration. When the measurement area is large, the distortions and misalignments between the cameras across the wide field of view lead to calibration errors that are difficult to correct. During the steel plate production, various machines generate vibrations that can disrupt the accuracy of the multi-camera structured light measurement system. The vibrations can cause misalignments in the camera and lasers used in the multi-camera structured light measurement system, leading to deformation or distortion of the projected light patterns.

SUMMARY

To solve the aforesaid problems, the disclosure provides a method for measuring and calibrating the dimensions of a steel plate.

The method comprises providing a calibration device and a measurement device, and performing a calibration process. The calibration device comprises a lifting mechanism, a fixation mechanism, and a calibration mechanism. The calibration mechanism is disposed on the lifting mechanism via the rotation mechanism and is movable along with the lifting mechanism. The method further employing a roller table. The lifting mechanism is disposed on both sides of the roller table via the fixation mechanism. The calibration mechanism comprises a plurality of calibration plates. Each of the plurality of calibration plates comprises a main plate and a chessboard calibration board disposed on the main plate.

The measurement device comprises a plurality of cameras and two line lasers. The plurality of cameras are disposed apart from each other and fixed on a horizontal plane. The two line lasers are disposed parallel to each other.

The calibration process comprises:

S1. fixedly disposing the calibration mechanism on the roller table; aligning the top surface of the calibration mechanism with the surface of the steel plate being measured, defining the top surface of the calibration mechanism as a baseline position; and defining a working distance $H_0$ between the plurality of cameras and the baseline position;

S2. raising the calibration mechanism by a known height 4H using the lifting mechanism; defining a working distance $H_2$ between the plurality of cameras and the calibration mechanism raised by the known height $\Delta H$; calculating parameters $P_0$ and $D_0$ at the working distance $H_0$, and calculating parameters $P_2$ and $D_2$ at the working distance $H_2$; where, the parameters $P_0$ and $P_2$ are single-pixel precision of the plurality of cameras at the working distance $H_0$ and $H_2$, respectively; and the parameters Do and $D_2$ are distances between the laser centerline in the image and the image center at the working distance $H_0$ and $H_2$, respectively;

S3. capturing, using the two laser lines, the data about $X_w$, $Y_w$, and $Z_w$ coordinates in the world coordinate system, and combining the data to construct the surface of the steel plate;

S31. $Z_w$ coordinate of the surface of the steel plate according to the S2 and the inherent properties of the plurality of cameras, calculating the parameters $P_0$, $P_2$, $D_0$, $D_2$, $V_0$, $V_2$, as well as the image height V, image width U, and the vertical field angle β of the camera lens; during the measurement process, defining the working distance $H_x$ between the camera lens and the steel plate being measured; establishing relationship between the height difference $\Delta H_x$ ($\Delta H_x = H_x - H_0$) and the parameters to solve the $Z_w$ coordinate;

where, the measurement is divided into five different cases; for each of the five cases, triangle similarity is used to connect the height difference $\Delta H_x$ and the parameters; and the parameters $v_0$, $v_2$ are the v-coordinates in the image plane when the plurality of cameras are at a specific working distance $H_0$ and $H_2$, respectively;

S32. $X_w$ coordinate of the surface of the steel plate:

stitching the 3D data obtained by each of the plurality of cameras; disposing the plurality of cameras so that there is a common overlapping field of view between every two adjacent cameras; disposing the chessboard calibration board on the main plate within an overlapping field of view of two adjacent cameras; capturing the images from both cameras, and defining matching points, thereby allowing for the calculation of a spatial transformation matrix; mapping, using the spatial transformation matrix, the coordinate system of each camera to a reference coordinate system, thereby aligning the coordinates from the plurality of cameras in the same coordinate system; determining the relationship between the point cloud data from every two adjacent cameras;

S33. $Y_w$ coordinate of the surface of the steel plate:

beginning the measurement process at t=0; defining the movement velocity $V_p$ of the steel plate; and calculating, using the following formula, the $Y_w$ coordinate:

$$Y_w = V_p * t$$

In a class of this embodiment, in S2, the method further comprises:

S21. single-pixel precision $P_0$ the chessboard calibration board is disposed within the overlapping field of view of two adjacent cameras; the chessboard calibration board comprises a plurality of black squares; the first one of the plurality of black squares has a known edge length, a, in the real-world measurement; each of the plurality of cameras captures an image of the chessboard calibration board; a program is used to detect the corner points of the black squares in the image of the chessboard calibration board; the corner points of the black squares are used to calculate the coordinate difference Δy between two adjacent corner points along the v-coordinate of the image; the coordinate difference Δy represents the number of pixels that a corner edge spans along the v-coordinate; by knowing the edge length of the first black square a, the single-pixel precision $P_0$ is calculated as follows: $P_0=a/\Delta y$;

S22. a distance $D_0$ between the laser centerline and the image center the grayscale centroid method is used to extract the laser centerline with sub-pixel precision; the grayscale centroid method identifies the position of the laser centerline in the image at the working distance $H_0$, and calculates the v-coordinate $v_0$ of the position of the laser centerline; the image height (V) is known, and the image center corresponds to V/2; a distance $D_0$ between the laser centerline and the image center is calculated as: $D_0=v_0-V/2$; and S23. the grayscale centroid method is also used to calculate the parameters $P_2$ and $D_2$ for the plurality of cameras when the working distance is changed to $H_2$;

In a class of this embodiment, in S31, the five cases are defined as follows and solved using the following equations to model the relationship between the height difference $\Delta H_x$ and the parameters:

(a) when $v_2 < V/2,\ v_x < V/2,\ v_0 < V/2$, $$\frac{\Delta H_x}{\Delta H} = \frac{D_x * P_x - D_0 * P_0}{D_2 * P_2 - D_0 * P_0} \quad (1)$$

(b) when $v_2 < V/2,\ v_x < V/2,\ v_0 > V/2$, $$\frac{\Delta H_x}{\Delta H} = \frac{D_x * P_x + D_0 * P_0}{D_2 * P_2 + D_0 * P_0} \quad (2)$$

(c) when $v_2 < V/2,\ v_x = V/2,\ v_0 > V/2$,

-continued $$\frac{\Delta H_x}{\Delta H} = \frac{D_0 * P_0}{D_2 * P_2 + D_0 * P_0} \quad (3)$$

(d) when $v_2 < V/2,\ v_x > V/2,\ v_0 > V/2$, $$\frac{\Delta H_x}{\Delta H} = \frac{D_x * P_x - D_0 * P_0}{D_2 * P_2 + D_0 * P_0} \quad (4)$$

(e) when $v_2 > V/2,\ v_x > V/2,\ v_0 > V/2$, $$\frac{\Delta H_x}{\Delta H} = \frac{D_0 * P_0 - D_x * P_x}{D_0 * P_0 - D_2 * P_2} \quad (5)$$

where, $\Delta H=H_2-H_0$, the height difference ΔH is directly obtained from the digital display of the calibration mechanism; the difference $D_x$ can be obtained by extracting the coordinates of the laser centerline in the image; the parameters $P_0$, $P_2$, $D_0$, $D_2$ are obtained in S2; $\Delta H_2=H_x-H_0$; the height difference $\Delta H_x$ and the single-pixel precision $P_x$ are unknown;

Equation (6) is derived using the relationship between the parameters of the camera lens:

$$P = \frac{2H\tan(\beta/2)}{V} \quad (6)$$

according to Equation (6), the relationship between the height difference $\Delta H_x$ and the single-pixel precision $P_x$ can be determined; the two unknowns are then solved simultaneously with Equations (1) to (5), allowing the determination of $\Delta H_x$, and thus $Z_w$ coordinate, for the five different cases;

during the measurement process, the $v_x$ (the v-coordinate of the laser line in the image) is used to determine which case the measurement corresponds to; for four cases, a complex calculation (using Equation (6)) is used to compute the height $$Z'_w = \Delta H_x,$$

but in case (c), the result is directly obtained without additional computation;

In a class of this embodiment, a vibration compensation method is applied to correct the $Z_w$ coordinate;

the vibration compensation method is performed as follows:

as the steel plate moves at a constant speed, R1 and R2 represent the specific positions in the measurement process where the two laser lines are projected onto the surface of the steel plate, respectively; the $Z_w$ values calculated by the two laser lines at any given time t can be derived using Equations (7) and (8):

$$Z'_{wR1}(t) = \Delta H_{xR1} \quad (7)$$

$$Z'_{wR2}(t) = \Delta H_{xR2} \quad (8)$$

during each time interval Δt, the steel plate moves from the R2 position to the R1 position, causing laser measurement position on the steel plate to shift backward along the direction of movement; the time interval Δt ensures that the laser line at the R1 position and the laser line at the R2 position measures the same spot on the steel plate; however, due to vibrations in the steel plate during transport, a vibration offset S1 occurs between every two adjacent measurements:

$$S_1 = Z'_{wR2} - Z'_{wR2}(t_2) \tag{9}$$

to eliminate the effect of vibrations, the measurement results taken at time $t_2$ and all subsequent times must be adjusted by adding the vibration offset S1; specifically, at each time $t_i$, the measurement result at the R1 position has a vibration offset $S_{i-1}$ compared to the previous measurement taken at the R2 position; the vibration offset can be positive or negative; at a first time point $t_1$, if a reference measurement of the $Z_w$ coordinate of the steel plate is obtained at the R2 position,, then, at each time $t_i$, the corrected $Z_w$ coordinate of the steel plate (after compensating for the vibration) should be:

$$Z_w(t_1) = Z'_{wR2}(t_1) \tag{10}$$

$$Z_w(t_2) = Z'_{wR2}(t_2) + S_1$$

$$\ldots$$

$$Z_w(t_i) = Z'_{wR2}(t_i) + S_1 + S_2 + \ldots + S_{i-1}(i \geq 2)$$

In a class of this embodiment, the $X_w$ coordinate of the surface of the steel plate is calculated as follows:

$P_{iH}$ is the center coordinate of the chessboard calibration board on the right side of the $i_{th}$ camera; $P_{iL}$ is the center coordinate of the chessboard calibration board on the left side of the $i_{th}$ camera; $\Delta L_i$ is the actual length of the $i_{th}$ chessboard calibration board; $\Delta v_i$ is the size of the chessboard calibration board on the left side of the $i_{th}$ camera in terms of pixels in the image; $P_i$ is the actual size represented by one pixel in the $i_{th}$ camera; $H_i$ is the working distance between the steel plate and the $i_{th}$ camera. The working distance $H_i$ is substituted into Equation (6) to tailor the calculations:

$$P_i = \frac{2(H_i - \Delta H_i)\tan(\beta/2)}{V} \tag{11}$$

$\Delta H_i$ represents the height increment in the area where the data from two adjacent cameras is stitched together; the first camera is used as a reference point for the stitching process; as measurements move to the right, the x-coordinate is incremented sequentially; Equation (12) is used to calculate the 3D data of the dimensions of the steel plate along the x-coordinate when i cameras are involved in the measurement process.

$$X_w = P_{1H} * P_1 + (P_{2H} - P_{2L}) * P_2 + \ldots + (v_i - P_{iL}) * P_i v_i \geq P_{iL},\ i \geq 1 \tag{12}$$

The following advantages are associated with the disclosure:

The disclosure uses the calibration device to quantify the positional relationship of the laser lines as captured by cameras. When calculating 3D data, the method considers the variations in pixel-to-actual size ratios caused by different distances between the steel plate and the plurality of cameras. The adjustment compensates for the measurement errors caused by material undulations, such as surface waviness and irregular shapes. Additionally, the vibration compensation method is employed to reduce the impact of vibrations on the accuracy of 3D measurements. Finally, the point cloud data collected by the plurality of cameras is stitched together based on the relative positions of the plurality of cameras. The stitching process comprises aligning and unifying all data points into a single reference coordinate system, thereby allowing for accurate 3D measurement of the surface profile of standardized sheet materials.

DETAILED DESCRIPTION

To further illustrate the disclosure, embodiments detailing a method for measuring and calibrating the dimensions of a steel plate are described below. It should be noted that the following embodiments are intended to describe and not to limit the disclosure.

A method for measuring and calibrating the dimensions of a steel plate, and the method comprises employing a calibration device, a measurement device, and a roller table.

Figure 1:
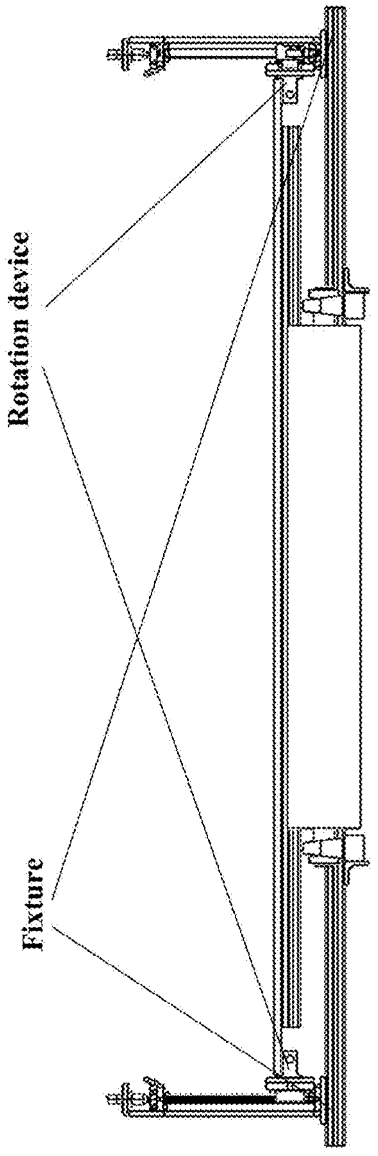
FIG. 1 is a front view of a calibration device according to one embodiment of the disclosure.
Figure 2:
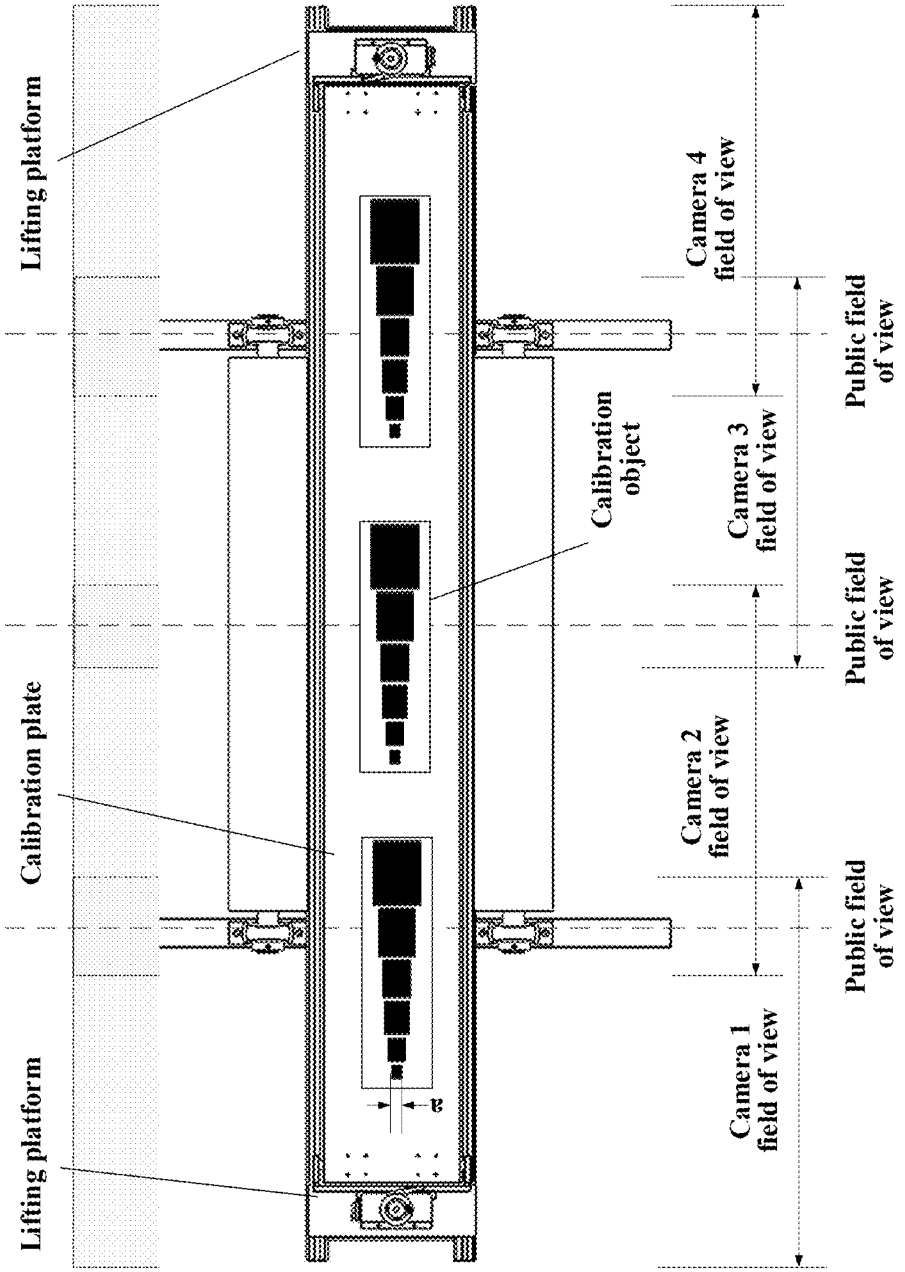
FIG. 2 is a top view of a calibration device according to one embodiment of the disclosure.
Figure 3:
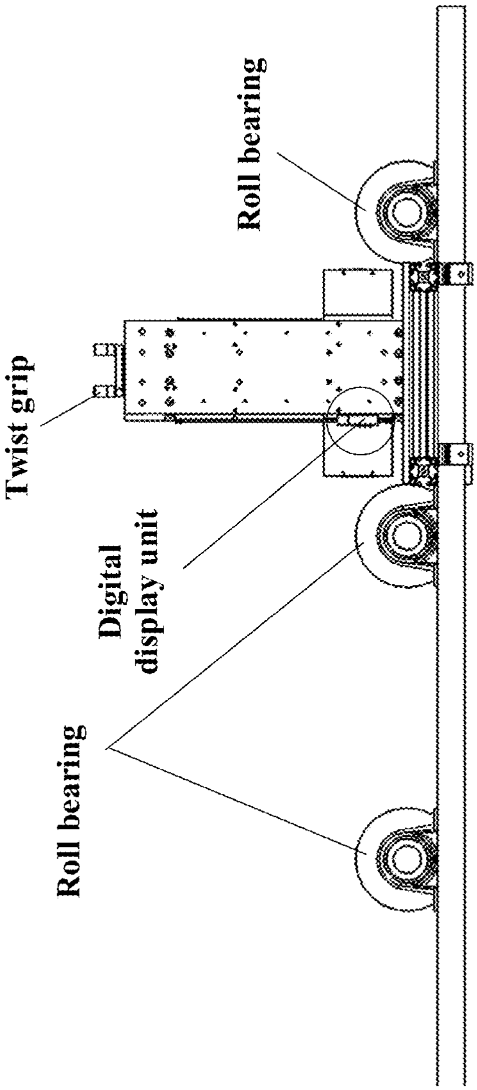
FIG. 3 is a left view of a calibration device according to one embodiment of the disclosure.

As shown in FIGS. 1-3, the calibration device comprises a lifting mechanism, a fixation mechanism, a rotation mechanism, and a calibration mechanism. The lifting mechanism comprises a lifting platform. The lifting platform is capable of handling heavy loads while maintaining high accuracy in height adjustments. To ensure the accuracy of the method, the elevation precision of the lifting mechanism is set as no less than 0.5 mm. The lifting platform comprises a digital display. The digital display has a reading accuracy of 0.1 mm, ensuring users monitor the exact elevation of the calibration mechanism in real-time.

The fixation mechanism comprises aluminum profiles. The fixation mechanism is rectangular in shape. Two plates are disposed on both sides of the fixation mechanism, respectively. The two plates are used to securely hold the lifting platform. As the lifting mechanism raises or lowers the calibration mechanism, the rotation mechanism ensures that the height is consistent across both sides of the calibration mechanism, thereby preventing deformation of the calibration mechanism during vertical adjustments. The calibration mechanism comprises a plurality of calibration plates. Each of the plurality of calibration plates comprises a main plate and a chessboard calibration board disposed on the main plate. The two aluminum profiles are welded to the bottom surface of the main plate to enhance the bending strength of the calibration mechanism. The chessboard calibration board is disposed on the top surface of the main plate to calibrate the camera parameters.

Figure 4:
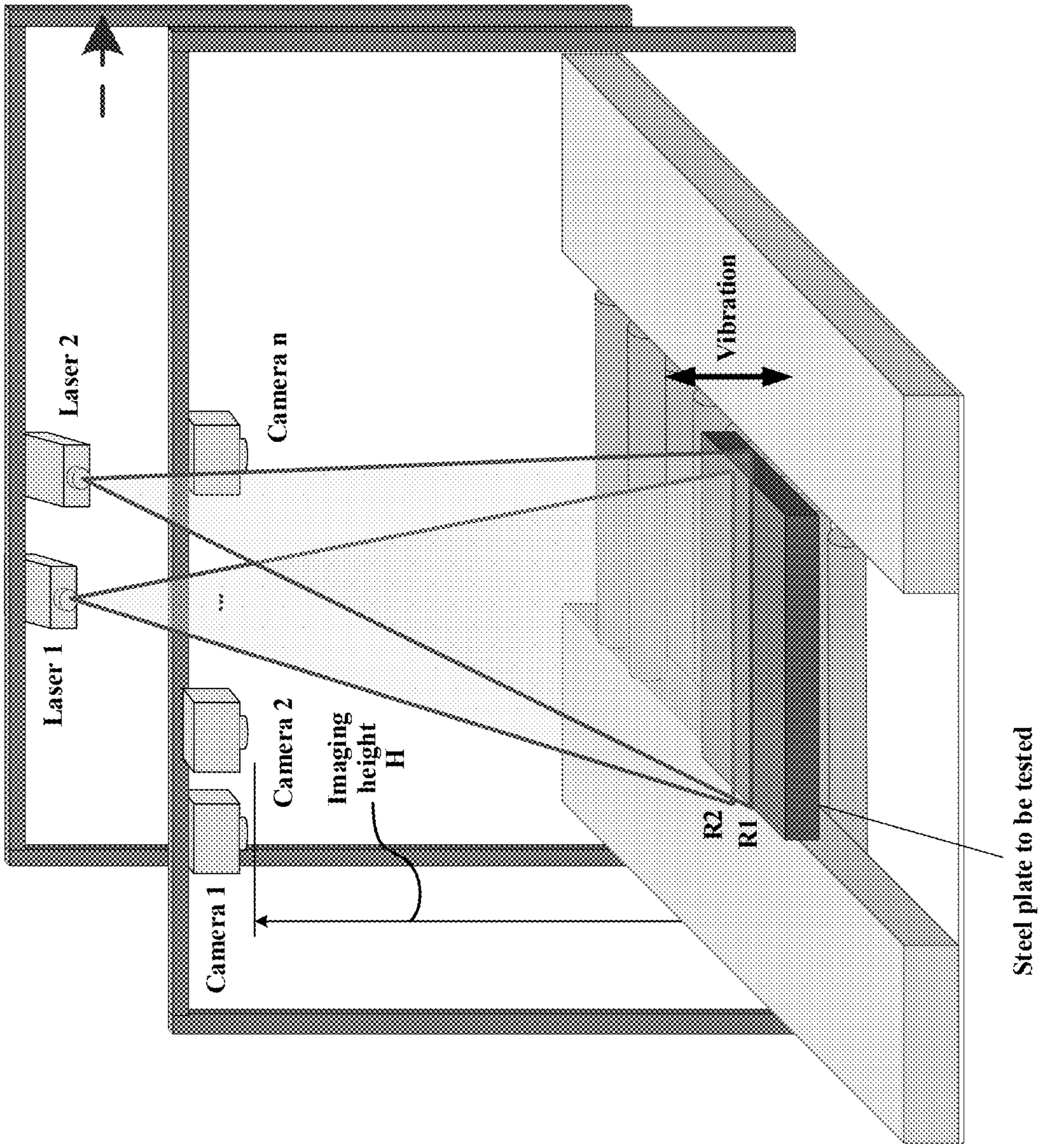
FIG. 4 is a perspective view of a measurement device according to one embodiment of the disclosure.

As shown in FIG. 4, the measurement device comprises a plurality of cameras and two line lasers. The plurality of cameras are disposed apart from each other and fixed on a horizontal plane. The two line lasers are disposed parallel to each other. The number of the plurality of cameras is determined based on the size and specifications of the steel plate being measured.

Figure 5:
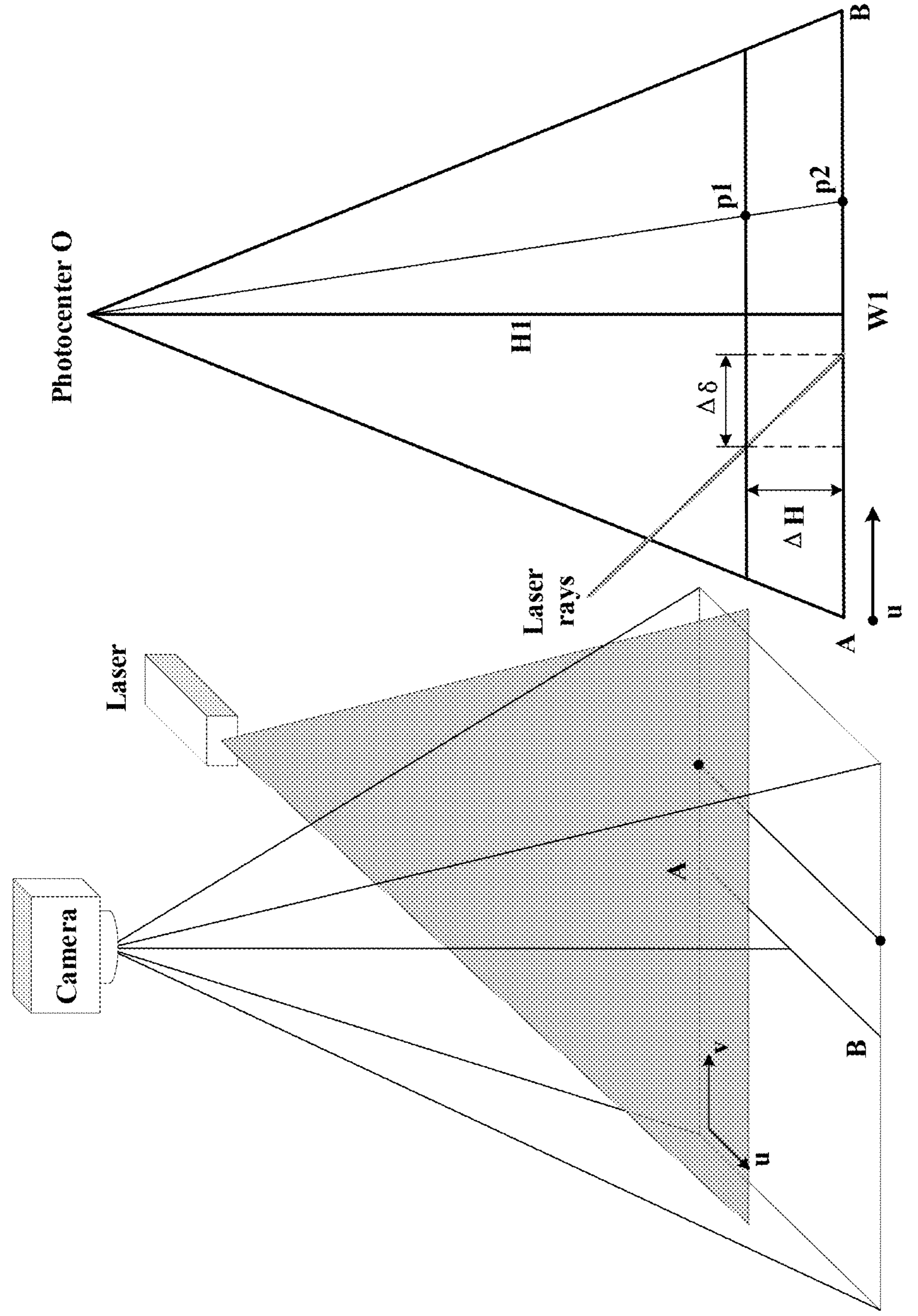
FIG. 5 illustrates a calibration principle of a method according to one embodiment of the disclosure.
Figure 6A:
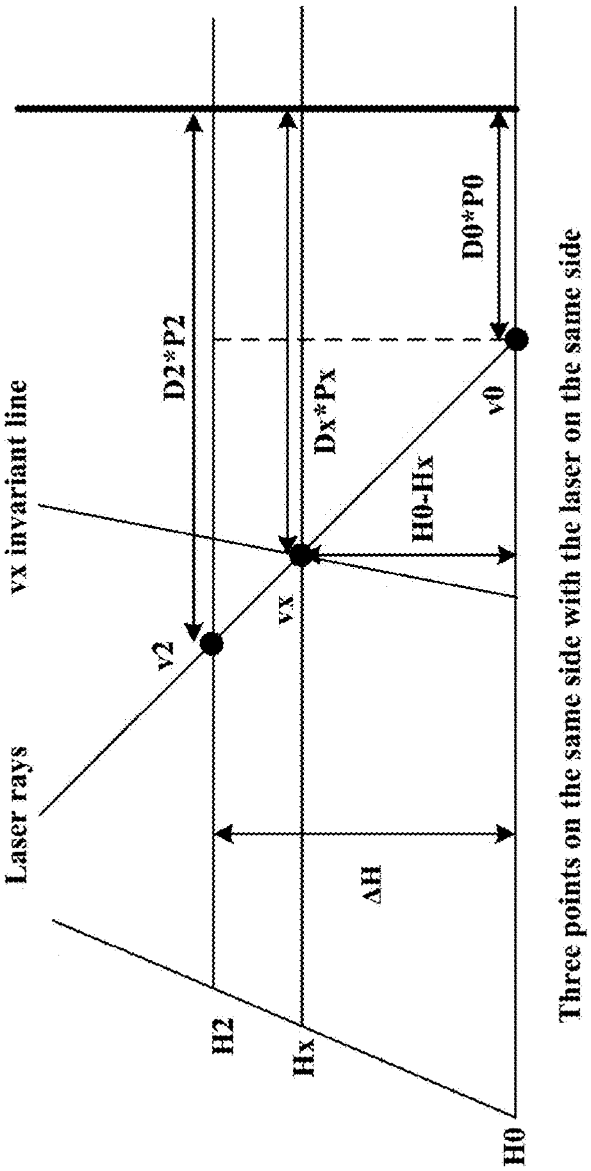
FIGS. 6A-6E illustrates a calculation principle of 3D surface data according to one embodiment of the disclosure.
Figure 6B:
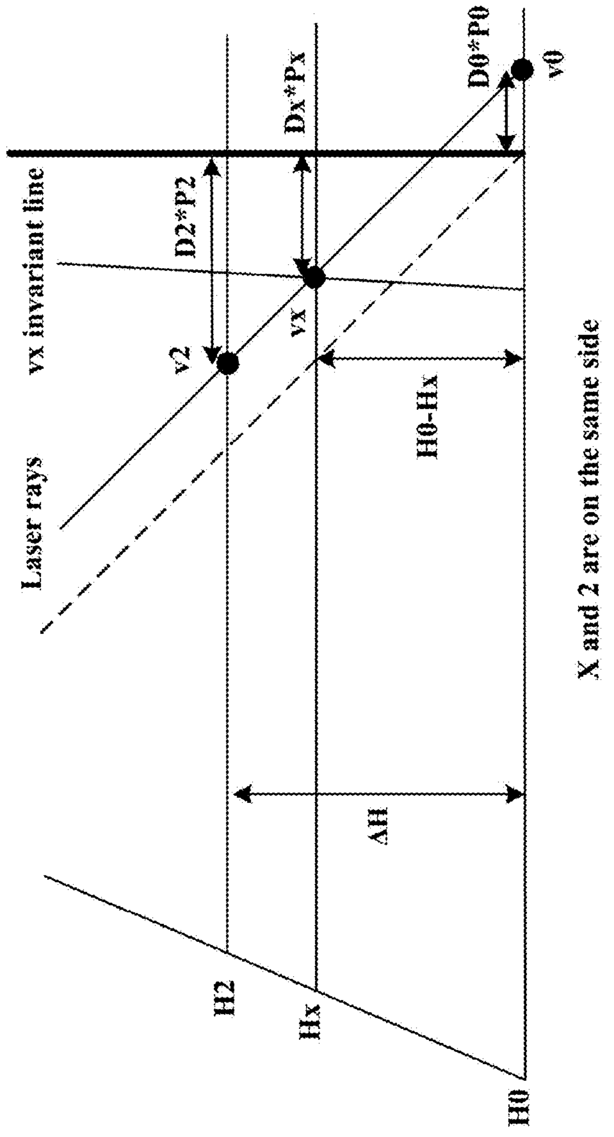
Figure 6C:
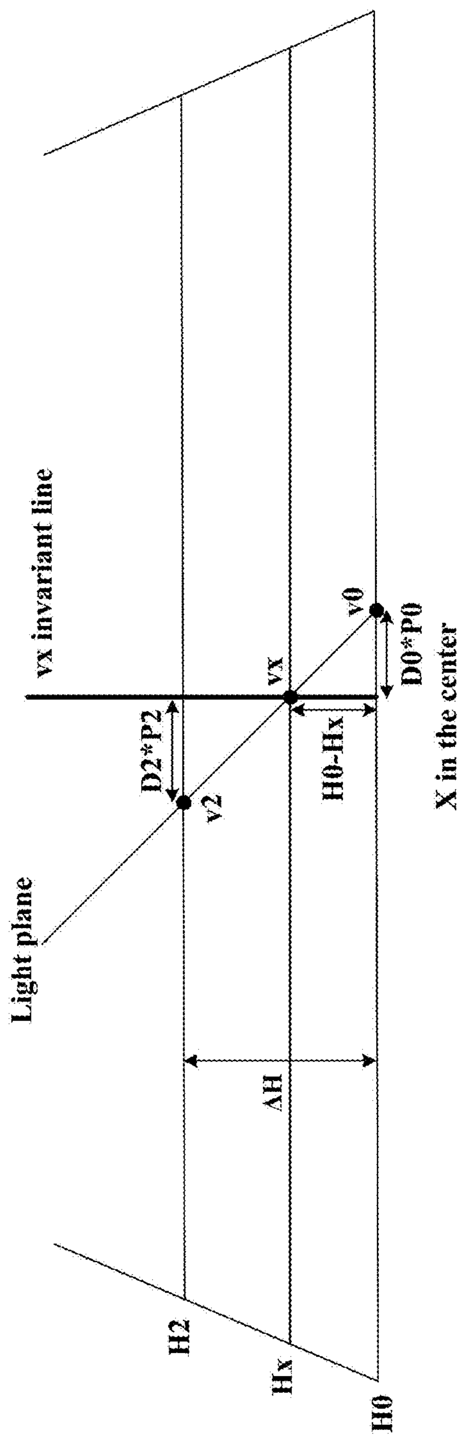
Figure 6D:
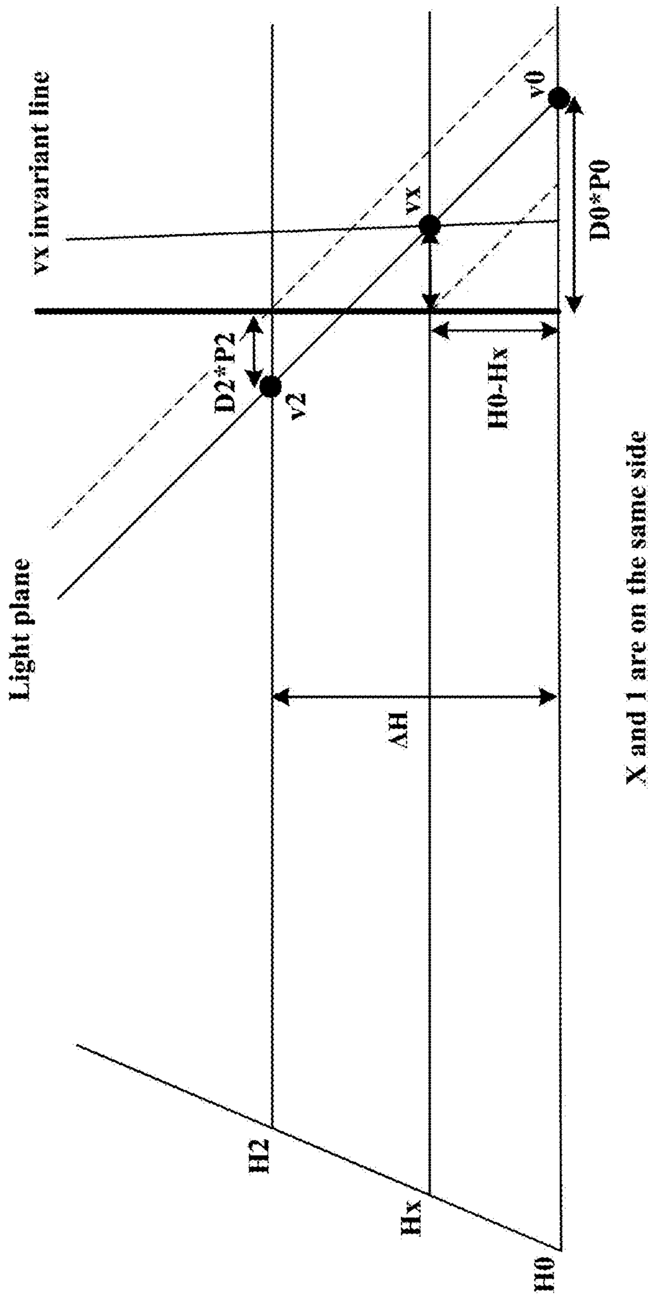
Figure 6E:
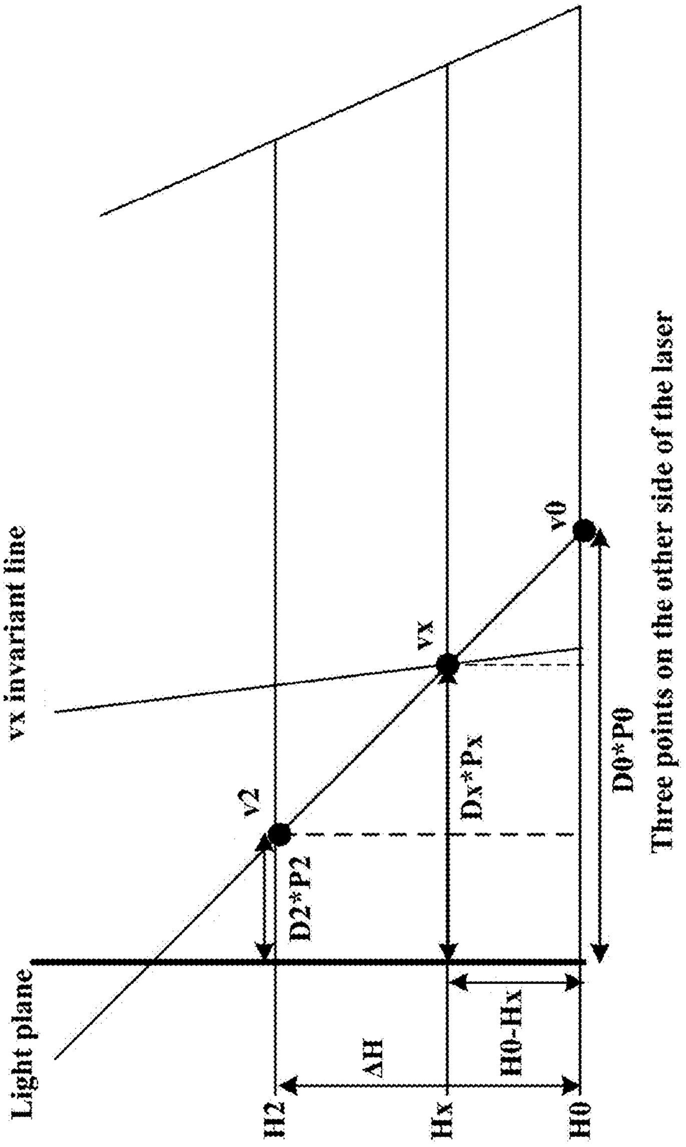

The calibration principle of the method is described as follows:

As shown in FIG. 5, the method further comprises performing a calibration process. The calibration process comprises analyzing the position shift of a laser line in captured images, and determining the 3D height profile of the surface of the steel plate. The calibration process is used to determine a conversion factor between pixel displacement and height change on the surface of the steel plate.

The position shift of the laser line in captured images is determined through a direct calibration method by calculating the pixel offset. The direct calibration method comprises simplifying the imaging model of each of the plurality of cameras into a projection model, as shown in FIG. 5. In the projection model, an image plane is represented by a 2D coordinate system, where the u-coordinate corresponds to the pixel column, and the v-coordinate corresponds to the pixel row in the captured image. The light from one of the plurality of the cameras is projected onto the surface of the steel plate, thereby forming a triangular projection OAB. The point O is the optical center of one of the plurality of the camera. When the height of the surface of the steel plate changes by $\Delta H$, the laser line projected on the surface of the steel plate shifts its position on the image plane. The shift results in a pixel displacement $\Delta\delta$. As shown in FIGS. 1-3, the calibration mechanism is freely movable up and down and displays the height changes in the position of the steel plate in real time.

As the calibration mechanism moves vertically, the pixel displacement $\Delta\delta$ occurs, and the working distance H between the plurality of cameras and the steel plate also changes. The change alters the field of view of each of the plurality of cameras and impacts the precision of each pixel, known as single-pixel precision ($P_i$). The direct calibration method further comprises calculating the single-pixel precision $P_i$ at various working distances. By adjusting the variations, the method ensures accurate 3D surface measurements of the steel plate.

The calibration process further comprises configuring the following parameters:

- $H_i$: the working distance between the camera lens and the steel plate being measured;
- $P_i$: the single-pixel precision of the camera at a specific working distance $H_i$; the single-pixel precision refers to the actual physical size represented by a single pixel in the captured image at the specific working distance;
- $D_i$: the distance between the laser centerline in the image and the image center at a specific working distance $H_i$; and
- $v_i$: the v-coordinate in the image plane when the plurality of cameras are at a specific working distance $H_i$.

Specifically, the method comprises:

S1. The calibration mechanism is fixedly disposed on the roller table. The top surface of the calibration mechanism is aligned with the surface of the steel plate being measured, thereby establishing a baseline position. A working distance Ho between the plurality of cameras and the top surface of the calibration mechanism is defined.

S2. The calibration mechanism is raised by a known height $\Delta H$ using the lifting mechanism. The working distance $H_2$ between the plurality of cameras and the calibration mechanism raised by the known height $\Delta H$ is defined. Four parameters $P_0$, $D_0$, $P_2$, and $D_2$ are calculated at both working distances $H_0$ and $H^2$.

S21. Single-pixel precision $P_0$

As shown in FIG. 2, the chessboard calibration board is disposed within the overlapping field of view of two adjacent cameras. The chessboard calibration board comprises a plurality of black squares. The first one of the plurality of black squares has a known edge length, a, in the real-world measurement. Each of the plurality of cameras captures an image of the chessboard calibration board. A program is used to detect the corner points of the black squares in the image of the chessboard calibration board. The corner points of the black squares are used to calculate the coordinate difference $\Delta y$ between two adjacent corner points along the v-coordinate of the image.

The coordinate difference $\Delta y$ represents the number of pixels that the corner edge spans along the v-coordinate. By knowing the edge length of the first black square a, the single-pixel precision $P_0$ is calculated as follows: $P_0=a/\Delta y$.

S22. A distance $D_0$ between the laser centerline and the image center

The grayscale centroid method is used to extract the laser centerline with sub-pixel precision. The grayscale centroid method identifies the position of the laser centerline in the image at the working distance $H_0$, and calculates the v-coordinate $v_0$ of the position of the laser centerline. The image height (V) is known, and the image center corresponds to V/2. A distance $D_0$ between the laser centerline and the image center is calculated as: $D_0=v_0-V/2$.

S23. The grayscale centroid method is also used to calculate the parameters $P_2$ and $D_2$ for the plurality of cameras when the working distance is changed to $H_2$.

S3. 3D reconstruction of the surface of the steel plate

To find the exact coordinates of the surface of the steel plate in a 3D space, the coordinates in the world coordinate system are labeled as ($X_w$, $Y_w$, $Z_w$). Two laser lines are used to scan the surface of the steel plate, as shown in FIG. 4.

S31. $Z_w$ coordinate of the surface of the steel plate

From the S2 process and the inherent properties of the plurality of cameras, the parameters $P_0$, $P_2$, $D_0$, $D_2$, $V_0$, $V_2$, as well as the image height V, image width U, and the vertical field angle $\beta$ of the camera lens are obtained. During the measurement process, the working distance $H_x$ between the camera lens and the steel plate being measured of the camera lens is defined. The relationship between the height difference $\Delta H_x$ ($\Delta H_x=H_x-H_0$) and the parameters is established to solve for the $Z_w$ coordinate. The parameters $v_0$, $V_2$ are the v-coordinates in the image plane when the plurality of cameras are at a specific working distance $H_0$ and $H_2$, respectively.

As the surface of the steel plate is at different heights during the measurement process, the position of the laser centerline shifts. To handle the shift, the measurement is divided into five different cases. As shown in FIGS. 6A-6E, for each of the five cases, the method uses triangle similarity to connect the height difference $\Delta H_x$ and the parameters.

Similar triangles in FIGS. 6A-6E are used to derive the following equations:

$$(a)\text{ when } v_2 < V/2,\ v_x < V/2,\ v_0 < V/2,$$

$$\frac{\Delta H_x}{\Delta H} = \frac{D_x * P_x - D_0 * P_0}{D_2 * P_2 - D_0 * P_0} \tag{1}$$

$$(b)\text{ when } v_2 < V/2,\ v_x < V/2,\ v_0 > V/2,$$

$$\frac{\Delta H_x}{\Delta H} = \frac{D_x * P_x + D_0 * P_0}{D_2 * P_2 + D_0 * P_0} \tag{2}$$

$$(c)\text{ when } v_2 < V/2,\ v_x = V/2,\ v_0 > V/2,$$

$$\frac{\Delta H_x}{\Delta H} = \frac{D_0 * P_0}{D_2 * P_2 + D_0 * P_0} \tag{3}$$

$$(d)\text{ when } v_2 < V/2,\ v_x > V/2,\ v_0 > V/2,$$

$$\frac{\Delta H_x}{\Delta H} = \frac{D_x * P_x - D_0 * P_0}{D_2 * P_2 + D_0 * P_0} \tag{4}$$

$$(e)\text{ when } v_2 > V/2,\ v_x > V/2,\ v_0 > V/2,$$

$$\frac{\Delta H_x}{\Delta H} = \frac{D_0 * P_0 - D_x * P_x}{D_0 * P_0 - D_2 * P_2} \tag{5}$$

where, $A\Delta = H_2 - H_0$, the height difference $\Delta H$ is directly obtained from the digital display of the calibration mechanism; the difference $D_x$ can be obtained by extracting the coordinates of the laser centerline in the image; the parameters $P_0$, $P_2$, $D_0$, $D_2$ are obtained in S2; $\Delta H_x = H_x - H_0$; the height difference $\Delta H_x$ and the single-pixel precision $P_x$ are unknown.

Figure 7:
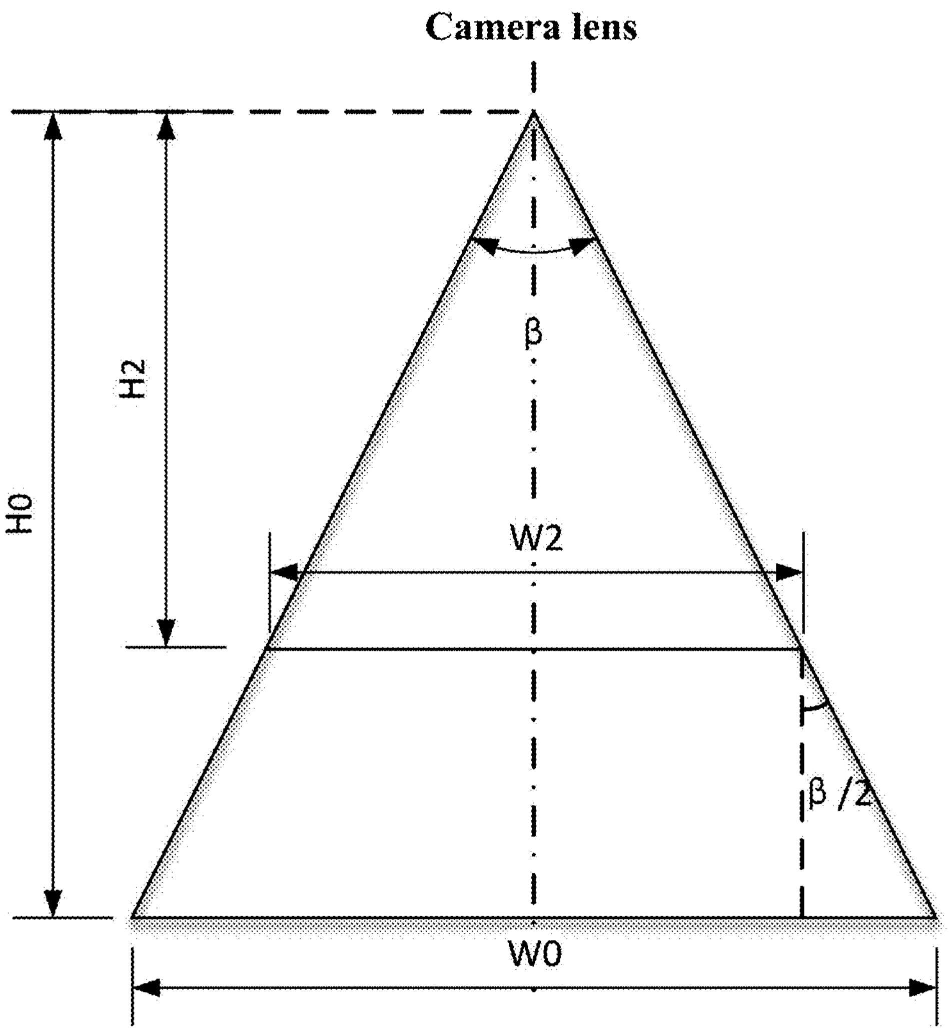
FIG. 7 illustrates a relationship between field of view of a camera and a working distance of the same camera according to one embodiment of the disclosure.

FIG. 7 illustrates the relationship between the parameters of the camera lens.

$W_0$ and $W_2$ represent the field of view of the camera at two different working distances $H_0$ and $H_2$, respectively. $\beta$ is the vertical field angle of the camera lens.

Using FIG. 7, Equation (6) is derived.

$$P = \frac{2H\tan(\beta/2)}{V} \tag{6}$$

According to Equation (6), the relationship between the height difference $\Delta H_x$ and the single-pixel precision $P_x$ can be determined. The two unknowns are then solved simultaneously with Equations (1) to (5), allowing the determination of $\Delta H_x$, and thus $Z_w$, for the five different cases.

During the measurement process, the $v_x$ (the v-coordinate of the laser line in the image) is used to determine which case the measurement corresponds to. For most cases, a complex calculation (using Equation (6)) is used to compute the height $$Z'_w = \Delta H_x,$$

but in case (c), the result is directly obtained without additional computation.

Since the method is designed for online, real-time analysis, vibrations during the transport of the steel plate introduce errors. The vibrations affect the accuracy of the measurement, especially in the vertical direction ($Z_w$). As a result, a vibration compensation method is applied to correct the vertical movement and improve measurement accuracy.

The vibration compensation method works as follows:

As the steel plate moves at a constant speed, R1 and R2 represent the specific positions in the measurement process where the two laser lines are projected onto the surface of the steel plate, respectively. The $Z_w$ values calculated by the two laser lines at any given time t can be derived using Equations (7) and (8).

$$Z'_{wR1}(t) = \Delta H_{xR1} \tag{7}$$

$$Z'_{wR2}(t) = \Delta H_{xR2} \tag{8}$$

Figure 8:
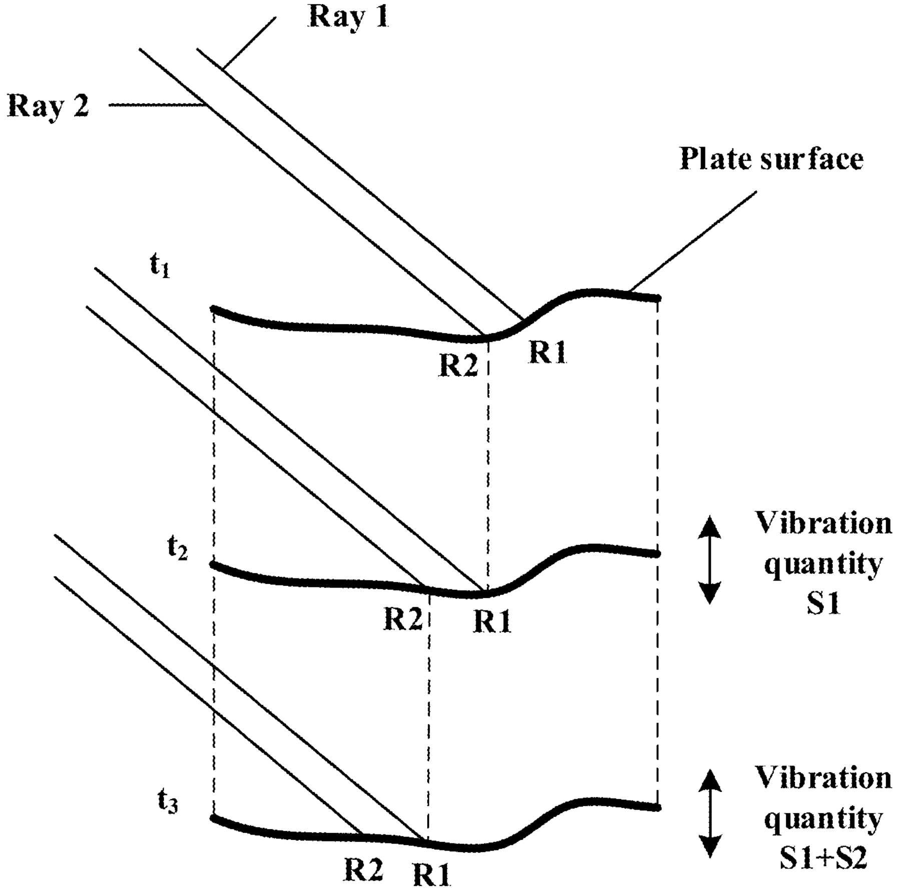
FIG. 8 illustrates a vibration compensation principle of a method according to one embodiment of the disclosure.

During each time interval $\Delta t$, the steel plate moves from the R2 position to the R1 position, causing laser measurement position on the steel plate to shift backward along the direction of movement. The time interval $\Delta t$ ensures that the laser line at the R1 position and the laser line at the R2 position measures the same spot on the steel plate. However, due to vibrations in the steel plate during transport, a vibration offset S1 occurs between every two adjacent measurements, as shown by the red dashed lines in FIG. 8.

$$S_1 = Z'_{wR2}(t_1) - Z'_{wR2}(t_2) \tag{9}$$

To eliminate the effect of vibrations, the measurement results taken at time $t_2$ and all subsequent times must be adjusted by adding the vibration offset S1. Specifically, at each time $t_i$, the measurement result at the R1 position has a vibration offset $S_{i-1}$ compared to the previous measurement taken at the R2 position. The vibration offset can be positive or negative. At a first time point $t_1$, if a reference measurement of the $Z_w$ coordinate of the steel plate is obtained at the R2 position, then, at each time ti, the corrected $Z_w$ coordinate of the steel plate (after compensating for the vibration) should be:

$$Z_w(t_1) = Z'_{wR2}(t_1) \tag{10}$$

$$Z_w(t_2) = Z'_{wR2}(t_2) + S_1$$

$$\ldots$$

$$Z_w(t_i) = Z'_{wR2}(t_i) + S_1 + S_2 + \ldots + S_{i-1} (i \geq 2)$$

Figure 9:
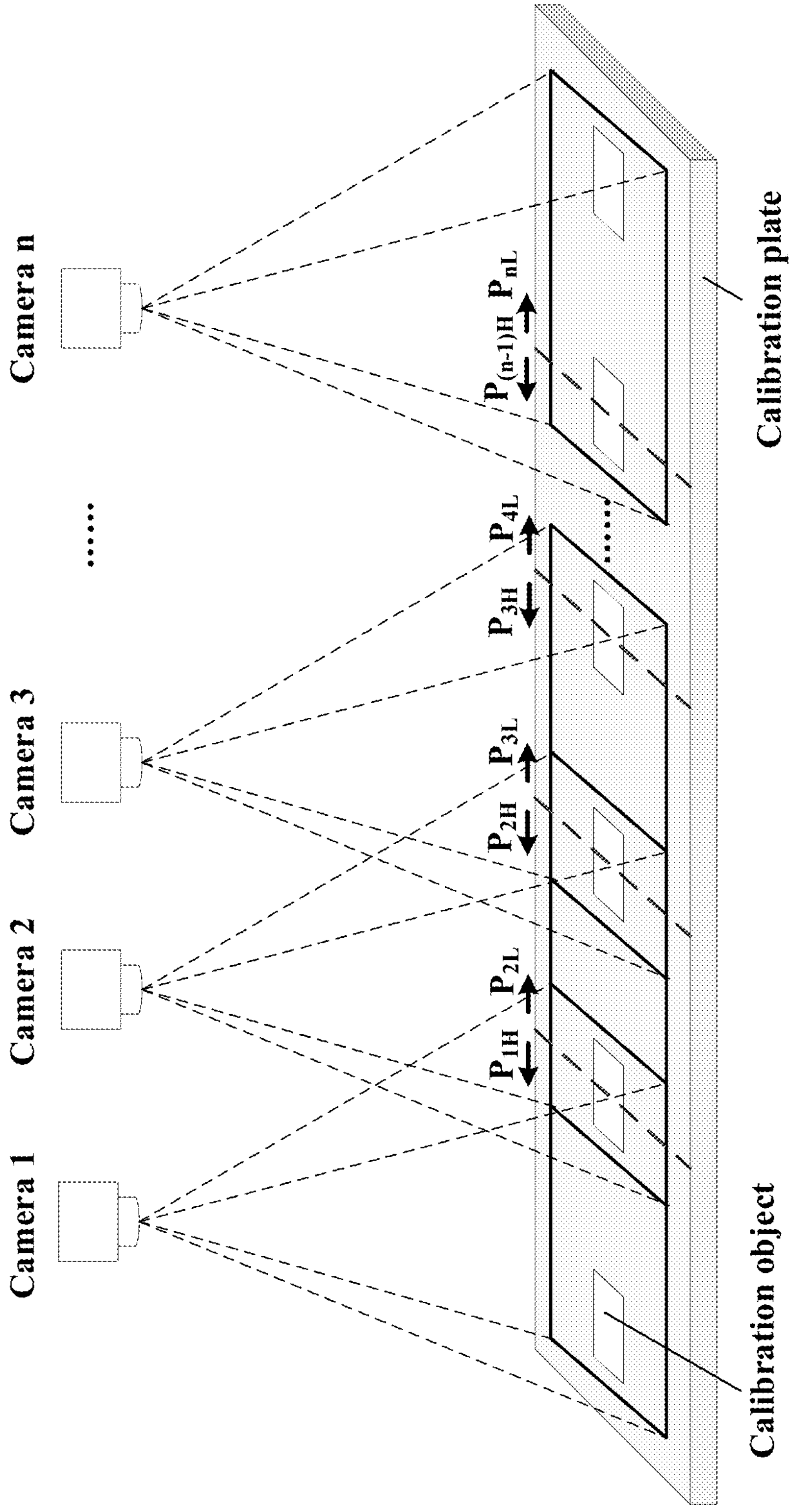
FIG. 9 is a schematic view of 3D data stitching of a method according to one embodiment of the disclosure.

S32. $X_w$ coordinate of the surface of the steel plate:

To complete the data measurement of the dimensions of the steel plate, the 3D data obtained by each of the plurality of cameras is stitched together. The position of each camera is determined so that there is a common overlapping field of view between every two adjacent cameras, as shown in FIG. 9. The chessboard calibration board is disposed on the main plate. The chessboard calibration board is disposed within the overlapping field of view of two adjacent cameras. By capturing the images from both cameras, matching points are identified, thereby allowing for the calculation of a spatial transformation matrix. The spatial transformation matrix is then used to map the coordinate system of each camera to a reference coordinate system. The mapping process ensures that the coordinates from the plurality of cameras are aligned in the same coordinate system. Once the coordinate systems are unified, the relationship between the point cloud data from every two adjacent cameras are determined. The relationship allows for direct stitching of the point cloud data in the 3D space, avoiding the complex calculations involved in feature matching when using point cloud data from the plurality of cameras.

As shown in FIG. 9, $P_{iH}$ is the center coordinate of the chessboard calibration board on the right side of the $i_{th}$ camera; $P_{iL}$ is the center coordinate of the chessboard calibration board on the left side of the $i_{th}$ camera; $\Delta L_i$ is the actual length of the $i_{th}$ chessboard calibration board; $\Delta v_i$ is the size of the chessboard calibration board on the left side of the $i_{th}$ camera in terms of pixels in the image; $P_i$ is the actual size represented by one pixel in the $i_{th}$ camera; $H_i$ is the working distance between the steel plate and the $i_{th}$ camera. The working distance $H_i$ is substituted into Equation (6) to tailor the calculations:

$$P_i = \frac{2(H_i - \Delta H_i)\tan(\beta/2)}{V} \tag{11}$$

$\Delta H_i$ represents the height increment in the area where the data from two adjacent cameras is stitched together. The first camera is used as a reference point for the stitching process. As measurements move to the right, the x-coordinate is incremented sequentially. Equation (12) is used to calculate the 3D data of the dimensions of the steel plate along the x-coordinate when i cameras are involved in the measurement process.

$$X_w = P_{1H} * P_1 + (P_{2H} - P_{2L}) * P_2 + \ldots + (v_i - P_{iL}) * P_i v_i \geq P_{iL},\ i \geq 1 \tag{12}$$

S33. $Y_w$ coordinate of the surface of the steel plate:

The measurement process begins at t=0. The value of $Y_w$ coordinate at any time t is directly proportional to the movement velocity $V_p$ of the steel plate. Specifically, the $Y_w$ coordinate can be calculated as follows:

$$Y_w = V_p * t \tag{13}$$

The method employs the two laser lines to measure the surface of the steel plate. The two laser lines capture precise data in the X, Y, and Z coordinates. By combining the precise data from the X, Y, and Z coordinates, the 3D surface of the steel plate is constructed.

It will be obvious to those skilled in the art that changes and modifications may be made, and therefore, the aim in the appended claims is to cover all such changes and modifications.

What is claimed is:

1. A method for measuring and calibrating dimensions of a steel plate by using a calibration device and a measurement device, the calibration device comprising a lifting mechanism, a fixation mechanism, a rotation mechanism, and a calibration mechanism; the calibration mechanism being disposed on the lifting mechanism via the rotation mechanism and being movable along with the lifting mechanism; the measurement device comprising a roller table, a plurality of cameras, and two line lasers; the lifting mechanism being disposed on both sides of the roller table via the fixation mechanism; the plurality of cameras being disposed apart from each other and fixed on a horizontal plane; and the two line lasers being disposed parallel to each other; the calibration mechanism comprises a plurality of calibration plates; each of the plurality of calibration plates comprises a main plate and a chessboard calibration board disposed on the main plate;

the method comprising:

S1. fixedly disposing the calibration mechanism on the roller table;

aligning a top surface of the calibration mechanism with a surface of the steel plate being measured, and defining the top surface of the calibration mechanism as a baseline position; and defining a working distance $H_0$ between the plurality of cameras and the baseline position;

S2. capturing, by the plurality of cameras, an image of a laser line from the two line lasers, wherein the image is represented on an image plane having a u-coordinate corresponding to a pixel column and a v-coordinate corresponding to a pixel row; raising the calibration mechanism by a known height $\Delta H$ using the lifting mechanism; defining a working distance $H_2$ between the plurality of cameras and the calibration mechanism raised by the known height $\Delta H$; calculating parameters $P_0$ and $D_0$ at the working distance $H_0$, and calculating parameters $P_2$ and $D_2$ at the working distance $H_2$, wherein, the parameters $P_0$ and $P_2$ are single-pixel precision of the plurality of cameras at the working distance $H_0$ and $H_2$, respectively, and the parameters $D_0$ and $D_2$ are distances between a laser centerline in an image and an image center at the working distance $H_0$ and $H_2$, respectively, wherein the laser centerline has a position with a v-coordinate of $v_0$ and a y-coordinate of $v_2$ in the image plane at the working distances $H_0$ and $H_2$, respectively;

S3. capturing, using two laser lines from the two line lasers, data about coordinates ($X_w$, $Y_w$, $Z_w$) of a surface of the steel plate in a world coordinate system, and combining the data to construct the surface of the steel plate;

S31. acquiring $Z_w$ coordinate of the surface of the steel plate:

according to S2 and inherent properties of the plurality of cameras, calculating the parameters $P_0$, $P_2$, $D_0$, $D_2$, $v_0$, $v_2$, an image height V, an image width U, and a vertical field angle $\beta$ of a camera lens; during a measurement process, defining a working distance $H_x$ between the camera lens and the steel plate being measured; establishing a relationship between a height difference $\Delta H_x$ ($\Delta H_x = H_x - H_0$) and the parameters to solve the $Z_w$ coordinate;

wherein, the measurement is divided into five different cases; for each of the five cases, triangle similarity is used to connect the height difference $\Delta H_x$ and the parameters;

S32. acquiring $X_w$ coordinate of the surface of the steel plate:

stitching 3D data obtained by each of the plurality of cameras; disposing the plurality of cameras so that there is a common overlapping field of view between every two adjacent cameras; disposing the chessboard calibration board on the main plate within an overlapping field of view of two adjacent cameras; capturing images from every two adjacent cameras, and defining matching points, thereby allowing for the calculation of a spatial transformation matrix; mapping, using the spatial transformation matrix, a coordinate system of each camera to a reference coordinate system, thereby aligning the coordinates from the plurality of cameras in the same coordinate system; determining a relationship between point cloud data from every two adjacent cameras;

S33. acquiring $Y_w$ coordinate of the surface of the steel plate:

beginning the measurement process at t=0; defining a movement velocity $V_p$ of the steel plate; and calculating, using the following formula, the $Y_w$ coordinate:

$$Y_w = V_p * t.$$

2. The method of claim 1, wherein, S2 is performed as follows:

S21. acquiring single-pixel precision $P_0$:

the chessboard calibration board is disposed within the overlapping field of view of two adjacent cameras; the chessboard calibration board comprises a plurality of black squares; a first one of the plurality of black squares has a known edge length, a, in the real-world measurement; each of the plurality of cameras captures an image of the chessboard calibration board; a program is used to detect corner points of the black squares in the image of the chessboard calibration board; the corner points of the black squares are used to calculate a coordinate difference Δy between two adjacent corner points along the v-coordinate of the image; the coordinate difference Δy represents a number of pixels that a corner edge spans along the v-coordinate; by knowing the edge length of the first black square a, the single-pixel precision $P_0$ is calculated as follows: $P_0=a/\Delta y$;

S22. a distance $D_0$ between the laser centerline and the image center:

a grayscale centroid method is used to extract the laser centerline with sub-pixel precision; the grayscale centroid method identifies the position of the laser centerline in the image at the working distance Ho, and calculates the v-coordinate $v_0$ of the position of the laser centerline; the image height (V) is known, and the image center corresponds to V/2; a distance $D_0$ between the laser centerline and the image center is calculated as: $D_0=v_o-V/2$; and S23. the grayscale centroid method is also used to calculate the parameters $P_2$ and $D_2$ for the plurality of cameras when the working distance is changed to $H_2$.

3. The method of claim 1, wherein in S31, the five cases are defined as follows and solved using the following equations to model the relationship between the height difference $\Delta H_x$ and the parameters:

(*a*) when $v_2 < V/2$, $v_x < V/2$, $v_0 < V/2$, $$\frac{\Delta H_x}{\Delta H} = \frac{D_x * P_x - D_0 * P_0}{D_2 * P_2 - D_0 * P_0} \quad (1)$$

(*b*) when $v_2 < V/2$, $v_x < V/2$, $v_0 > V/2$, $$\frac{\Delta H_x}{\Delta H} = \frac{D_x * P_x + D_0 * P_0}{D_2 * P_2 + D_0 * P_0} \quad (2)$$

(*c*) when $v_2 < V/2$, $v_x = V/2$, $v_0 > V/2$, $$\frac{\Delta H_x}{\Delta H} = \frac{D_0 * P_0}{D_2 * P_2 + D_0 * P_0} \quad (3)$$

(*d*) when $v_2 < V/2$, $v_x > V/2$, $v_0 > V/2$,

-continued $$\frac{\Delta H_x}{\Delta H} = \frac{D_x * P_x - D_0 * P_0}{D_2 * P_2 + D_0 * P_0} \quad (4)$$

(*e*) when $v_2 > V/2$, $v_x > V/2$, $v_0 > V/2$, $$\frac{\Delta H_x}{\Delta H} = \frac{D_x * P_x - D_0 * P_0}{D_2 * P_2 - D_0 * P_0} \quad (5)$$

wherein, $\Delta H=H_2-H_0$, the height difference ΔH is directly obtained from a digital display of the calibration mechanism; the difference $D_x$ is obtained by extracting the coordinates of the laser centerline in the image; the parameters $P_0$, $P_2$, $D_0$, $D_2$ are obtained in S2; $\Delta H_x=H_x-H_0$; the height difference $\Delta H_x$ and the single-pixel precision $P_x$ are unknown; V is the image height; $v_0$, $V_x$, $V_2$ are v-coordinates of the position of the laser centerline at the working distances $H_0$, $H_x$, and $H_2$, respectively:

an equation (6) is derived using the relationship between the parameters of the camera lens:

$$P = \frac{2H\tan(\beta/2)}{V} \quad (6)$$

according to the equation (6), the relationship between the height difference $\Delta H_x$ and the single-pixel precision $P_x$ can be determined; the two unknowns are then solved simultaneously with the equations (1) to (5), allowing the determination of $\Delta H_x$, and thus $Z_w$ coordinate, for the five different cases;

during the measurement process, a v-coordinate $v_x$ of the laser centerline in the image is used to determine which case the measurement corresponds to; for four cases, the equation (6) is used to compute the height $$Z'_w = \Delta H_x,$$

but in case (c), the result is directly obtained without additional computation.

4. The method of claim 3, wherein a vibration compensation method is applied to correct the $Z_w$ coordinate;

the vibration compensation method is performed as follows:

as the steel plate moves at a constant speed, R1 and R2 represent specific positions in the measurement process where the two laser lines are projected onto the surface of the steel plate, respectively; the $Z_w$ values calculated by the two laser lines at any given time t are derived using Equations (7) and (8):

$$Z'_{wR1}(t) = \Delta H_{xR1} \quad (7)$$

$$Z'_{wR2}(t) = \Delta H_{xR2} \quad (8)$$

during each time interval Δt, the steel plate moves from the R2 position to the R1 position, causing laser measurement position on the steel plate to shift backward along the direction of movement; the time interval Δt ensures that the laser line at the R1 position and the laser line at the R2 position measures the same spot on the steel plate; however, due to vibrations in the steel plate during transport, a vibration $OS_1$ occurs between every two adjacent measurements:

$$OS_1 = Z'_{wR2}(t_1) - Z'_{wR2}(t_2) \tag{9}$$

to eliminate the effect of vibrations, measurement results taken at time $t_2$ and all subsequent times must be adjusted by adding the vibration offset $OS_1$: specifically, at each time ti, the measurement result at the R1 position has a vibration offset $OS_{i-1}$ compared to the previous measurement taken at the R2 position; the vibration offset can be positive or negative; at a first time point $t_1$, if a reference measurement of the $Z_w$ coordinate of the steel plate is obtained at the R2 position, then, at each time $t_i$, the corrected $Z_w$ coordinate of the steel plate is:

$$Z_w(t_1) = Z'_{wR2}(t_1) \tag{10}$$

$$Z_w(t_2) = Z'_{wR2}(t_2) + OS_1 \ \ldots \ Z_w(t_i) = Z'_{wR2}(t_1) + OS_2 + \ldots + OS_{i-1} (i \geq 2).$$

5. The method of claim 4, wherein the Xw coordinate of the surface of the steel plate is calculated as follows:

$P_{iH}$ is a center coordinate of the chessboard calibration board on a first side of an $i_{th}$ camera; $P_{iL}$ is a center coordinate of the chessboard calibration board on a second side of the $i_{th}$ camera; $\Delta L_i$ is an actual length of an $i_{th}$ chessboard calibration board; $\Delta v_i$ is a size of the chessboard calibration board on the second side of the $i_{th}$ camera in terms of pixels in the image; $Q_i$ is an actual size represented by one pixel in the $i_{th}$ camera; $W_i$ is a working distance between the steel plate and the $i_{th}$ camera; the working distance $W_i$ is substituted into Equation (6) to tailor the calculations:

$$Q_i = \frac{2(W_i - \Delta W_i)\tan(\beta/2)}{V} \tag{11}$$

$\Delta W_i$ represents a height increment in the area where the data from two adjacent cameras is stitched together; a first camera of the plurality of cameras is used as a reference point for the stitching process; as measurements move to the first side, the x-coordinate is incremented sequentially; Equation (12) is used to calculate the 3D data of the dimensions of the steel plate along the x-coordinate when i cameras are involved in the measurement process:

$$X_w = P_{1H}*Q_1 + (P_{2H} - P_{2L})*Q_2 + \ldots + (v_i - P_{iL})*Q_i v_i \geq P_{iL},\ i \geq 1 \tag{12}.$$

* * * * *